United States Patent Office 3,825,622
Patented July 23, 1974

---

3,825,622
IMPACT MODIFIED BLENDS OF VINYL CHLORIDE POLYMERS, LACTONE GRAFT COPOLYMERS AND STYRENE-DIENE-STYRENE BLOCK COPOLYMERS
Lloyd M. Robeson, Lebanon, and Louis A. Pilato, Bound Brook, N.J., and Robert E. Godlewski, Mahopac, N.Y., assignors to Union Carbide Corporation, New York, N.Y.
No Drawing. Filed Nov. 20, 1972, Ser. No. 307,843
Int. Cl. C08f 15/00, 19/00
U.S. Cl. 260—876 B                7 Claims

---

ABSTRACT OF THE DISCLOSURE

Vinyl chloride polymer compositions having a Masland cold crack test value of about −30° C. have been provided by combining lactone graft copolymers together with a styrene-diene-styrene block copolymer.

---

BACKGROUND OF THE INVENTION

This invention pertains to impact modified poly-blends of vinyl chloride polymers.

In the search for non-fugitive plasticizers for vinyl chloride polymers, poly(epsilon-caprolactone) showed promise because of its solubility in polyvinyl chloride and the low $T_g$ (glass transition temperature) of blends of these two polymers. However products, such as, sheets and films fabricated from these blends while initially clear become opaque due to crystallization of the poly(epsilon-caprolactone) and resultant phase separation. This problem is partially solved by substituting copolymers of poly(epsilon-caprolactone) grafted onto styrene/omega-hydroxyalkyl methacrylate copolymers for the poly(epsilon-caprolactone). Unfortunately it is not a complete solution of the problem because the low temperature impact properties as determined by the Masland cold crack test (a modified ASTM D–1790 test) were at best only marginal. In applications where polyvinyl chloride films are used, such as, pit, pool, and pond liners, a Masland cold crack temperature of −30° C. is required for both pigmented and unpigmented liners. For unpigmented blends of polyvinyl chloride and the above-described poly(epsilon-caprolactone) graft copolymers, the best Masland cold crack temperatures attained were −20° C. For pigmented liners these values were even worse, viz., −15 to −5° C.

It is therefore an object of this invention to provide blends of polyvinyl chloride and graft copolymers of poly(epsilon-caprolactone) which exhibit Masland cold crack temperatures of −30° C. in both the pigmented and unpigmented state.

As a corollary to the first, another object is to provide polyvinyl chloride blends whose Masland cold crack temperatures are stable over a period of time at −30° C.

Another object is to provide polyvinyl chloride blends which exhibit ease of processing, film forming properties and mechanical properties, such as, tensile strength, elongation, and modulus required for the films to be used as liners.

SUMMARY OF THE INVENTION

These objects have been satisfied by a composition which consists essentially of:
 (1) Normally solid vinyl chloride polymer
 (2) About 40 to about 85 parts by weight per 100 parts of vinyl chloride polymer of a graft copolymer of a lactone having the formula

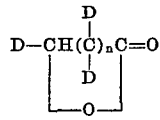

wherein $n$ is an integer having values of from about 3 to about 6, wherein at least $n$ plus two D's are hydrogen and wherein the remaining D's are lower alkyl groups having up to about 8 carbon atoms, said lactone being graft copolymerized onto a reactive polymer of ethylenically unsaturated monomers; and
 (3) About 7 to about 40% based on the weight of lactone copolymer (2) of a styrene-diene-styrene block copolymer wherein the diene contains about 4 to 5 carbon atoms and may optionally contain halogen, particularly chlorine, wherein the molecular weight of each styrene block is about 3,000 to about 50,000, the molecular weight of each of the diene blocks is about 10,000 to about 200,000 and the melt index of said copolymer is about 7 to about 13 dg./per minute. (ASTM D–1238 Condition E.)

The vinyl chloride polymers of this invention can be homopolymers of vinyl chloride or copolymers of vinyl chloride and other monomers copolymerizable therewith. Exemplary monomers include vinyl esters, such as, vinyl acetate, vinyl propionate, vinyl laurate, vinyl stearate, and the like; α-olefins, such as, ethylene, propylene, butylene, and the like; and alkyl acrylates, or methacrylates having up to 18 carbon atoms in the alkyl moiety. Preferred copolymers include vinyl chloride/vinyl acetate copolymers and vinyl chloride/ethylene copolymers. The vinyl chloride/vinyl acetate copolymers contain about 5 to about 20 weight percent of vinyl acetate copolymerized therein with a range of about 8 to about 15 percent by weight of vinyl acetate being particularly preferred. The preferred inherent viscosity of these vinyl chloride/vinyl acetate copolymers, which are known in the art, lies in a range of about 0.50 to about 0.54, although inherent viscosity of about 0.47 to about 0.80 can also be used if desired. Vinyl chloride homopolymers, also known in the art, which can be used in the practice of this invention preferably have inherent viscosities in the range of about 0.5 to about 1.0 although those having values of 0.40 to about 1.4 can also be used if desired.

The vinyl chloride/ethylene copolymers employed preferably contain about 0.3 to about 1.9 percent by weight of ethylene copolymerized therein. These copolymers preferably have an inherent viscosity of about 0.6 to about 0.8 although copolymers outside this range can also be used.

The diene component of the syrene-diene-styrene block copolymers of this invention is preferably butadiene, isoprene, chloroprene, or piperylene. Styrene-diene-styrene block copolymers are commercially available from Shell Chemical Company under the tradename Kraton. The designation S—B—S has been used for styrene-butadiene-styrene block copolymers and S—I—S for styrene-isoprene-styrene block copolymers. The styrene-diene-styrene block copolymers can be prepared by anionic solution polymerization methods with organo-metallic catalysts as disclosed in U.S. 3,265,765, and the Encyclopedia of Polymer Science and Technology, *15* pages 508–

530 Interscience Publishers, NYC 1971. Using the "living polymer" techniques with lithium alkyls, such as, n-butyl lithium in tetrahydrofuran, benzene, or diethyl ether, styrene and butadiene, piperylene, isoprene, or chloroprene are polymerized by sequential addition of styrene and diene monomers until blocks of each monomer are formed. The resultant block copolymers have a very narrow molecular weight distribution. The central polydiene blocks have molecular weight of about 50,000 to about 90,000 and the two polystyrene end blocks each have a molecular weight of about 10,000 to about 40,000 with a more preferred range of the former being about 50,000 to about 70,000 and the latter being about 10,000 to about 15,000. The total weight of styrene in the block copolymers is preferably about 20% to about 60% of the total weight with a preferred range being about 25% to about 30%.

Suitable lactones used for the preparation of the graft copolymers of this invention include delta-valerolactone, epsilon-caprolactone, zeta-enantholactone, eta-caprylolactone, mono-methyl-delta-valerolactone, dimethyl - delta-valerolactone, triethyl-delta-valerolactones, and the like. The reactive polymer of ethylenically unsaturated monomers used as the backbone of these lactone graft copolymers are obtained by the addition polymerization of at least one ethylenically unsaturated monomer selected from monomers represented by the formulae:

I 

IA 

either alone or in a mixture with different polymerizable ethylenically unsaturated monomers containing the polymerizable $CH_2=C<$ group. These reactive polymer backbones contain from about 0.1 mol percent to about a 100% mol percent of polymerized monomer represented by formula I or IA. The preferred backbone polymers are those containing from about 0.3 mol percent to about 10 mol percent of monomers I or IA polymerized therein. In formulae I and IA above R can be hydrogen, alkyl having from 1 to about 3 carbon atoms or $CH_2COOH$ and R''' can be —OH, —$OC_pH_{2p}OH$ in which $p$ has a value of from 1 to about 5 or higher, —$C_pH_{2p}NH_2$, —$OC_pH_{2p}COOH$, —$NH_pH_{2p}OH$, —$NHC_pH_{2p}NH_2$, —$NCH_pH_{2p}COOH$, $OC_pH_{2p}NHR''''$ or $NHC_pH_{2p}NHR''''$ where R'''' is alkyl having up to about 10 carbon atoms or more.

Illustrative of suitable vinyl monomers of Formula I and IA one can mention allyl alcohol, methallyl alcohol, ethallyl alcohol, acrylic acid, methacrylic acid, hydroxymethyl acrylate, hydroxymethyl methacrylate, 2-hydroxyethyl acrylate, 2-hydroxypropyl acrylate, 3-hydroxypropyl acrylate, 5-hydroxypentyl acrylate, 2-hydroxyethyl methacrylate, 2-hydroxyethyl ethacrylate, itaconic acid, aminomethyl acrylate, 2-aminoethyl acrylate, 2-aminoethyl methacrylate, 2 - (N - methylamino)ethyl acrylate, 2-(N-methylamino)propyl acrylate, 2 - (N - butylamino)ethyl methacrylate, 5-(N-methylamino)pentyl acrylate, 2-(N-decylamino)ethyl acrylate, 2-carboxyethyl acrylate, 2-carboxybutyl acrylate, 2-carboxyethyl acrylate, N - (2 - hydroxypropyl)acrylamide, N - (aminomethyl)acrylamide, N-carboxymethylacrylamide, 2 - (N - methylamino)ethyl acrylate, 2-(N-ethylaminopropyl) - acrylamide, and the like.

Illustrative of suitable polymerizable ethylenically unsaturated monomers containing the $CH_2=C<$ group that are copolymerized with the vinyl monomers one can mention ethylene, propylene, the butenes and the pentenes, styrene, butadiene, isoprene, acrylonitrile, methacrylonitrile, methyl methacrylate, ethyl acrylate, vinyl chloride, vinylidene chloride, vinyl fluoride, vinyl acetate, vinyl butyrate, vinyl benzoate, isopropenyl methyl ketone, vinyl phenyl ketone, vinyl methyl ketone, alpha-chlorovinyl methyl ketone, divinyl sulfide, vinyl ethyl sulfide, vinyl p-tolyl sulfide, vinyl ethyl sulfone, vinyl sulfonic acid, 2-vinyl pyridine, bicyclo[2.2.1]hept-2-ene, 5-ethylidenebicyclo[2.2.1]hept-2-ene, bicyclo[2.2.1]hept-2,5-diene, decyl acrylate, octadecyl methacrylate, N,N-dimethylaminoethyl acrylate, acrylamide, methacrylamide, ethacrylamide, N-methylacrylamide, N - methylmethacrylamide, N-propylacrylamide, N-pentylmethacrylamide, acryloxyacetamide, 2-methacryloxypropionamide, N-methylacryloxyacetamide, and the like. Any polymerizable ethylenically unsaturated monomer can be used; these are well known to those skilled in the art and the above listing is only exemplary thereof.

The polymerization and copolymerization of vinyl monomers and ethylenically unsaturated monomers by means of free radical polymerization initiators is well known. It is known that such polymerizations can be carried out in the absence of a solvent or in the presence of a solvent at temperatures of from about 40° C. to about 200° C. or higher. It is also known that the polymerizations can be carried out at subatmospheric, atmospheric or superatmospheric pressures. Among the known initiators used in the polymerization reaction are the per compounds such as di-t-butyl peroxide, t-butyl hydroperoxide, dicumyl peroxide, dibenzoyl peroxide, t-butyl peroxypivalate, lauroyl peroxide, acetyl peroxide, sodium persulfate, sodium perborate, sodium percarbonate, diisopropyl peroxydicarbonate, azobisisobutyronitrile, and the like.

Illustrative of suitable reactive polymers one can mention poly(methyl methacrylate/2-hydroxyethyl methacrylate), poly(methyl methacrylate/2-hydroxypropyl methacrylate), poly(ethylene/acrylic acid), poly(styrene/2-hydroxyethyl acrylate), poly(vinylchloride/methacrylic acid), poly(acrylic acid/2-hydroxyethyl acrylate), poly(vinyl acetate/2-hydroxyethyl methacrylate), poly(acrylonitrile/hydroxymethyl acrylate), poly(vinyl chloride/vinyl acetate/2-hydroxyethyl acrylate), poly(vinyl chloride/styrene/2 hydroxymethyl methacrylate), poly(vinyl acetate/2-aminoethyl acrylate), poly[vinyl chloride/2-(N-methylamino)ethyl acrylate], poly(vinylidene chloride/2-hydroxypropyl acrylate), poly(vinyl acetate/2-aminopropyl acrylate), poly(hydroxymethyl acrylate), poly(5-hydroxypentyl methacrylate), poly(2-aminoethyl acrylate), poly[2-(N-methylamino)ethyl methacrylate], and the like. These reactive polymers are those, therefore, that contain in the polymer chain in polymerized form the unit:

II 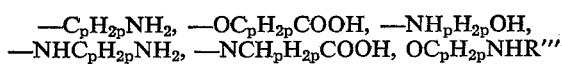

and this unit can be from 0.1 mole percent to 100 mole percent of the polymer chain. The reactive polymer can have a molecular weight as low as about 200 and can be as high as several million.

The lactone graft copolymers of this invention are produced by reacting a reactive polymer as hereinbefore described containing from 0.1 mole percent to 100 mole percent of polymerized units of Formula II in the molecule with a lactone or oxa-lactone using a known catalyst or activator for the lactone and oxa-lactone condensation reaction, such as stannous octoate, stannic octoate, sodium, potassium, sodium methoxide, potassium carbonate, magnesium carbonate, zinc borate, zinc oxide, lead silicate, cobaltous acetate, lead oxide, tetrabutyl titanate, dipropyl titanate, lithium hydride, lithium aluminum hydride, dibutyl zinc, aluminum triethoxide, triethyl aluminum, triisobutyl aluminum, and the like. Any of the catalysts or activators known to be useful for the condensation polymerization of lactones and oxa-lactones can be used. The concentration thereof can be from about 0.001 to about 5 weight percent based on the lactone or oxa-lactone charged; it is preferably, however, from about 0.01 to about 0.25 weight percent.

The graft polymerization is preferably carried out in the presence of an inert solvent that will dissolve the reactants and that will not interfere with the graft polymerization reaction. Illustrative thereof one can mention mineral spirits, benzene, toluene, xylene, octane, acetone, methyl ethyl ketone, and the like.

The graft polymerization is carried out at a temperature of from about 40° C. up to about 250° C. or higher. Any temperature can be used that does not decompose the reactants or the products or result in undersirable side reactions to any appreciable extent.

The reaction times will vary depending upon the particular reactants, the particular catalyst, the pressure, the temperature, the size of the batch and similar variables. This is known to those familiar with graft polymerization reactions and any time can be selected to obtain the desired graft copolymer product.

The amount of lactone that can be graft polymerized to the reactive polymer can be from about 0.1 to 50 times the weight of the reactive polymer; larger amounts can be used if desired. The preferred graft copolymers are those produced when the lactone or oxa-lactone is from about 0.5 to about 10 times the weight of the reactive polymer.

The invention is further described in the examples which follow. All parts and percentages are by weight unless otherwise specified.

EXAMPLE 1

In order to evaluate the formulations covered by the instant invention a master batch formulation was first prepared. The master batch was compounded on a steam-heated two-roll mill until a uniform sheet was obtained using the following ingredients:

| Ingredient: | Amount, wt. percent |
|---|---|
| Polyvinyl chloride [a] | 52.4 |
| Vinyzene BP-5 [b] | 2.3 |
| Flexol EPO [c] | 3.0 |
| PCL-780 [d] | 36.7 |
| Vanstay HTA [e] | 1.5 |
| Vanstay SD [f] | 0.5 |
| UV-9 [g] | 0.2 |
| FG-3717 [h] | 3.3 |

[a] QSAH-7, a vinyl chloride homopolymer having an inherent viscosity of 0.78 when measured as a 0.2 g. solution in cyclohexanone at 25° C. (ASTM D-1243).
[b] Trademark for Epoxidized soybean oil (95%) sold by Ventron Corp., containing an organo arsenate (1%) as a fungicide, and 4% nonylphenol.
[c] Trademark of Union Carbide Corp. for epoxidized soybean oil.
[d] A graft copolymer of 77% poly(ε-caprolactone) grafted onto a copolymer of 22.5% styrene and 0.5% hydroxyethyl methacrylate.
[e] A solid barium/cadmium salt mixture sold by H. T. Vanderbilt Co. as a heat stabilizer and lubricant.
[f] An organo phosphite vinyl heat stabilizer sold by H. T. Vanderbilt Co.
[g] An ultraviolet stabilizer sold by American Cyanamid Co.
[h] Carbon black pigment master batch sold by Wilson Products Co.

Components b, c, e, f, g, and h are optional and can be substituted for by any number of art recognized equivalents.

The above-described master batch was blended with varying amounts of potential impact modifiers to evaluate their efficacy. The impact strength at −30° C. of the various compositions tested was determined by a pendulum impact test consisting of gripping a specimen ⅛ inch by 4 inches by 0.020 inches, striking the specimen with a pendulum and then measuring the work to break.

The results of various impact modifiers blended with the master batch in terms of quality of compression molded film, ease of processing and impact strength at −30° C. are given in Table 1. Of the impact modifiers evaluated therein only the styrene-butadiene-styrene block copolymer was acceptable showing a pendulum impact of 96 lbs./in.³ vs. 28 lbs./in.³ for the Control in which no modifier was used. Surprisingly all the other modifiers lowered the pendulum impact strength to a level lower than the Control.

Brittle temperatures on a 75 mil compression molded sheet were also determined and the data obtained delineated in Table 2. The blend containing styrene-butadiene-styrene block copolymer was clearly superior.

TABLE 1

| Experiment number | Modifier percent by weight of total composition | Quality of film | Ease of processing | Pendulum impact strength at −30° C. in lbs./cu. in. |
|---|---|---|---|---|
| 1 | None (Control A-Example 1 blend alone). | Good; slight bloom. | Good | 28 |
| 2 | 10% KM-611 [1] | Good | do | 23 |
| 3 | 15% KM-611 | do | do | 9.5 |
| 4 | 10% Pellethane [2] | do | Mixing difficult; needs high temperature. | 28 |
| 5 | 10% chlorosulfonated polyethylene. [3] | Fair | Good | 6 |
| 6 | 10% neoprene | do | Mixing hard. | 4.5 |
| 7 | 10% buna rubber [4] | Good | Fair | 10.5 |
| 8 | 10% polyvinyl ethyl ether. | Poor, tacky. | Poor | 6 |
| 9 | 10% ethylene/acrylic acid copolymer. | Good | Good | 3 |
| 10 | 10% natural rubber | Poor, tacky. | Fair | |
| 11 | 10% Kraton 3125 [5] | Good | Good | 96 |

[1] A methyl methacrylate/butadiene/styrene terpolymer sold by Rohm and Haas Co.
[2] Pellethane is a thermoplastic polyurethane elastomer. Type used was Pellethane 2300-55D sold by The Upjohn Co.
[3] Hypalon-40 sold by Du Pont de Nemours and Co.
[4] Hycar 1002 sold by B. F. Goodrich Co.
[5] Styrene-butadiene-styrene block copolymer of Shell Chemical Co.

TABLE 2

| Experiment number | Modifier, percent by weight of total composition | Brittle temperature, ASTM D-747, C.⁶ |
|---|---|---|
| 12 | None, Control A-Example 1 blend alone | −2 |
| 13 | 10% Kraton 3125 | −14 |
| 14 | 10% KM-611 | −6 |

TABLE 3

| Experiment number | Composition | Masland cold crack temp., ° C., after 10 days | Masland cold crack temp., ° C., after 2¼ months |
|---|---|---|---|
| 15 | Example 1 master batch Control B, no pigment, no Kraton 3125. | −20 | −20 |
| 16 | Example 1 master batch Control A, pigmented, no Kraton 3125. | −5 | |
| 17 | Example 1 master batch unpigmented plus 10 wt. percent of Kraton 3125. | −35 | −30 |
| 18 | Example 1 master batch pigmented plus 10 wt. percent of Kraton 3125. | −30 | −30 |

Masland cold crack values were obtained to confirm the superiority of the blend of styrene-butadiene-styrene block copolymers with the master batch both pigmented and unpigmented (i.e. with and without FG-3717) and compared with a pigmented and unpigmented Control which lacked this impact modifier. The results obtained shown in Table 3 demonstrate that the addition of the styrene-butadiene-styrene block copolymer afforded the only satisfactory Masland cold crack temperatures for both pigmented and unpigmented vinyl chloride compositions.

EXAMPLE 2

The preparation of a lactone graft copolymer is given below.

A solution was prepared by dissolving 58.44 grams of methyl methacrylate, 15.6 grams of 2-hydroxyethyl methacrylate and 8 grams of a 75 wt. percent solution of t- butyl peroxy pivalate in mineral spirits in 600 grams of acetone.

This solution was equally divided into 6 pressure bottles, that were purged with nitrogen and sealed. The bottles were immersed in a 50° C. water bath and the polymerization was conducted for 70 hours. The contents of the bottles were consolidated and the viscous solution was diluted with acetone. This solution was then poured into methanol to precipitate the reactive methyl methacrylate/2 - hydroxyethyl methacrylate copolymer. The filtered copolymer was washed several times with methanol and dried. The solid white copolymer had a reduced viscosity of 0.35 dl./g. measured using a solution of 0.2 grams in 100 ml. of toluene at 30° C.

The 50 grams portion of the methyl methacrylate/2-hydroxyethyl methacrylate copolymer was added to 50 grams of epsilon-caprolactone and 0.07 grams of stannous octanoate. The reaction mixture was stirred at 165° C. to 185° C. for about one hour and cooled to room temperature. The product was dissolved in benzene at room temperature and a large excess of heptane was added to precipitate the lactone graft copolymer. The white, solid lactone graft copolymer was filtered and dried in a vacuum oven at 140° C. It had a reduced viscosity of 0.74 dl./g. measured as a solution of 0.2 grams in 100 ml. of benzene at 30° C.

In the same manner as described in the preceding paragraph a graft of epsilon-caprolactone onto a copolymer on styrene and 2-hydroxyethyl acrylate was prepared. This graft copolymer contains 77% by weight of epsilon-caprolactone, 22.5% of styrene and 0.5 percent of 2-hydroxymethacrylate. It had a reduced viscosity when measured in benzene as a concentration of 0.2 grams in 100 ml. of benzene of 0.70 dl./g.

EXAMPLES 3–5

When Example 1 is repeated using 15 and 20 weight percent respectively of Kraton 3125, comparable Masland cold crack test temperatures are obtained.

EXAMPLES 6–8

When Example 1 is repeated replacing the vinyl chloride homopolymer with a vinyl chloride/vinyl acetate (85:15) copolymer, a vinyl chloride/ethylene (98.5:1.5) copolymer, or a vinyl chloride/ethyl acrylate (95:5) copolymer, comparable Masland cold crack test temperatures are obtained.

Although the invention has been described in its preferred forms with a certain amount of particularity it is understood that the present disclosure has been made only by way of example, and that numerous changes can be made without departing from the spirit and scope of the invention.

What is claimed is:

1. Vinyl chloride polymer composition having a Masland cold crack test value of about −30° C. which consists essentially of:
   (1) normally solid vinyl chloride polymer selected from the group consisting of homopolymers of vinyl chloride and copolymers of vinyl chloride containing up to about 20% by weight of a monomer selected from the group consisting of vinyl esters having 2 to 18 carbon atoms and α-olefins having 2 to about 4 carbon atoms copolymerized therein
   (2) about 40 to about 85 parts by weight per 100 parts of vinyl chloride polymer of a graft copolymer of a lactone having the formula:

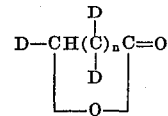

wherein $n$ is an integer having values of from about 3 to about 6 wherein at least $n+$ two D's are hydrogen and wherein the remaining D's are lower alkyl groups having up to about 8 carbon atoms, about 0.1 to 50 parts of said lactone being graft copolymerized onto one part of a reactive organic copolymer backbone of ethylenically unsaturated monomers having polymerizable $CH_2=C<$ groups and hydroxy alkyl acrylates or methacrylates; and
   (3) about 7 to about 40% based on the weight of lactone graft copolymer (2) of a styrene-butadiene-styrene block copolymer wherein the diene contains about 4 to 6 carbon atoms wherein the molecular weight of each styrene block is about 3,000 to about 50,000, the molecular weight of each of the diene blocks is about 10,000 to about 200,000, the melt index of said block copolymer is about 7 to about 13 dg. per minute as measured by ASTM D–1238 Condition E and the total weight of styrene in said block copolymer is about 20% to about 60% of the total block copolymer weight.

2. Composition claimed in claim 1 wherein the lactone of the graft copolymer is epsilon-caprolactone.

3. Composition claimed in claim 2 wherein the reactive organic polymer backbone is a copolymer of styrene and 2-hydroxyethyl methacrylate.

4. Composition claimed in claim 1 wherein the styrene-diene-styrene block copolymer is a styrene-butadiene-styrene block copolymer.

5. Composition claimed in claim 1 wherein the styrene-diene-styrene block copolymer is a styrene-isoprene-styrene block copolymer.

6. Composition claimed in claim 1 wherein the styrene-diene-styrene block copolymer is a styrene-chloroprene-styrene block copolymer.

7. Composition claimed in claim 1 wherein the styrene-diene-styrene block copolymer is a styrene-piperylene-styrene block copolymer.

References Cited
UNITED STATES PATENTS

| | | | |
|---|---|---|---|
| 3,557,252 | 1/1971 | Hsieh et al. | 260—876 B |
| 3,562,360 | 2/1971 | King et al. | 260—898 |
| 3,021,310 | 2/1962 | Cox et al. | 260—873 |
| 3,379,794 | 4/1968 | King et al. | 260—898 |

MURRAY TILLMAN, Primary Examiner

R. B. TURER, Assistant Examiner

U.S. Cl. X.R.

260—32.8 A, 32.8 R, 33.6 A, 33.6 UA, 41.5 MP, 45.7 R, 45.75 R, 874, 899, 901